(12) United States Patent
Miller (10) Patent No.: US 10,838,284 B1
(45) Date of Patent: Nov. 17, 2020

(54) CAMERA CANOPY

(71) Applicant: Gerald Miller, Brooklyn, NY (US)

(72) Inventor: Gerald Miller, Brooklyn, NY (US)

( * ) Notice: Subject to any disclaimer, the term of this patent is extended or adjusted under 35 U.S.C. 154(b) by 19 days.

(21) Appl. No.: 16/455,228

(22) Filed: Jun. 27, 2019

(51) Int. Cl.
*G03B 17/56* (2006.01)
*G03B 11/04* (2006.01)
*H04N 5/225* (2006.01)

(52) U.S. Cl.
CPC ............. *G03B 17/56* (2013.01); *G03B 11/04* (2013.01); *H04N 5/2252* (2013.01)

(58) Field of Classification Search
CPC .... G03B 17/561; G03B 17/566; G03B 17/56; G03B 11/04; G03B 2217/002
USPC .................................. 396/42, 428, 534, 544
See application file for complete search history.

(56) References Cited

U.S. PATENT DOCUMENTS

| | | | | |
|---|---|---|---|---|
| 6,979,137 B1 * | 12/2005 | Saliaris | ................ | G03B 17/561 396/422 |
| 10,051,162 B2 * | 8/2018 | Jung | ...................... | G03B 17/55 |
| 2003/0201005 A1 * | 10/2003 | Hilmersen | ............. | A45B 11/00 135/16 |

FOREIGN PATENT DOCUMENTS

| | | | |
|---|---|---|---|
| CN | 2266905 Y | * 11/1997 | |
| CN | 200969017 Y | * 10/2007 | |
| CN | 201097077 Y | * 8/2008 | |
| TW | M-413375 U1 | * 10/2011 | |
| WO | WO-2015062173 A1 | * 5/2015 | ............. G03B 17/56 |

OTHER PUBLICATIONS

"Camera Canopy"; Camera Canopy; Weebly; 2019; <https://www.cameracanopy.com/> (Year: 2019).*

* cited by examiner

*Primary Examiner* — John Villecco (57) ABSTRACT

A three piece adjustable and removable covering, consisting of an assembly of a stationary shield fitted with an adjustable/detachable upper shield and a removable rear shield for protecting a camera from inclement weather which is mounted to a support bracket and a hot shoe assembly for attachment of the bracket and covering(s) to the equipment. The bracket is a preformed shape which, with the shield(s), forms the protective covering. Nuts, washers, and bolts are employed to affix the bracket to the protective shield(s) and to the equipment.

1 Claim, 16 Drawing Sheets

CAMERA CANOPY

BACKGROUNDS AND SUMMARY OF THE INVENTION

In accordance with the invention, a protective covering assembly for protecting the camera includes: a protective covering for the equipment, which incorporates an adjustable protective shield, a rigid bracket attached to the shield, a Hot Shoe assembly, to attach to the equipment, a guide bracket for adjusting said shield secured by nuts, washers and bolts.

The shield design allows rain to roll off and around the equipment without it actually inhibiting the user from full access to and protection of the equipment.

Optionally, the shield is easily and repeatedly attachable and removable from the bracket due to its two piece configuration.

It is noted that lightweight aluminum is used for the bracket and guide; plastic is used for the shield.

While exemplary embodiment in accordance with the invention are illustrated and enclosed, such disclosure should not be construed as to limit the claim. It is anticipated that various modifications and alternative designs may be made without departing from the scope of the invention.

BRIEF SUMMARY OF THE INVENTION

This invention relates to protective coverings for a camera; more particularly to such coverings which protect from inclement weather, in particular, the disclosed invention.

Said equipment has long been susceptible to the effects of inclement weather. Most current available coverings are awkward and not user friendly. In addition, they do not afford as complete coverage of the equipment from inclement weather.

My present invention provides a protective shield offering more complete equipment coverage while incorporating a degree of convenience, simplicity and flexibility of significant advantage to the user.

BRIEF DESCRIPTION OF THE DRAWINGS

In the attached drawing

DETAILED DESCRIPTION OF THE DRAWINGS

Figure 1:
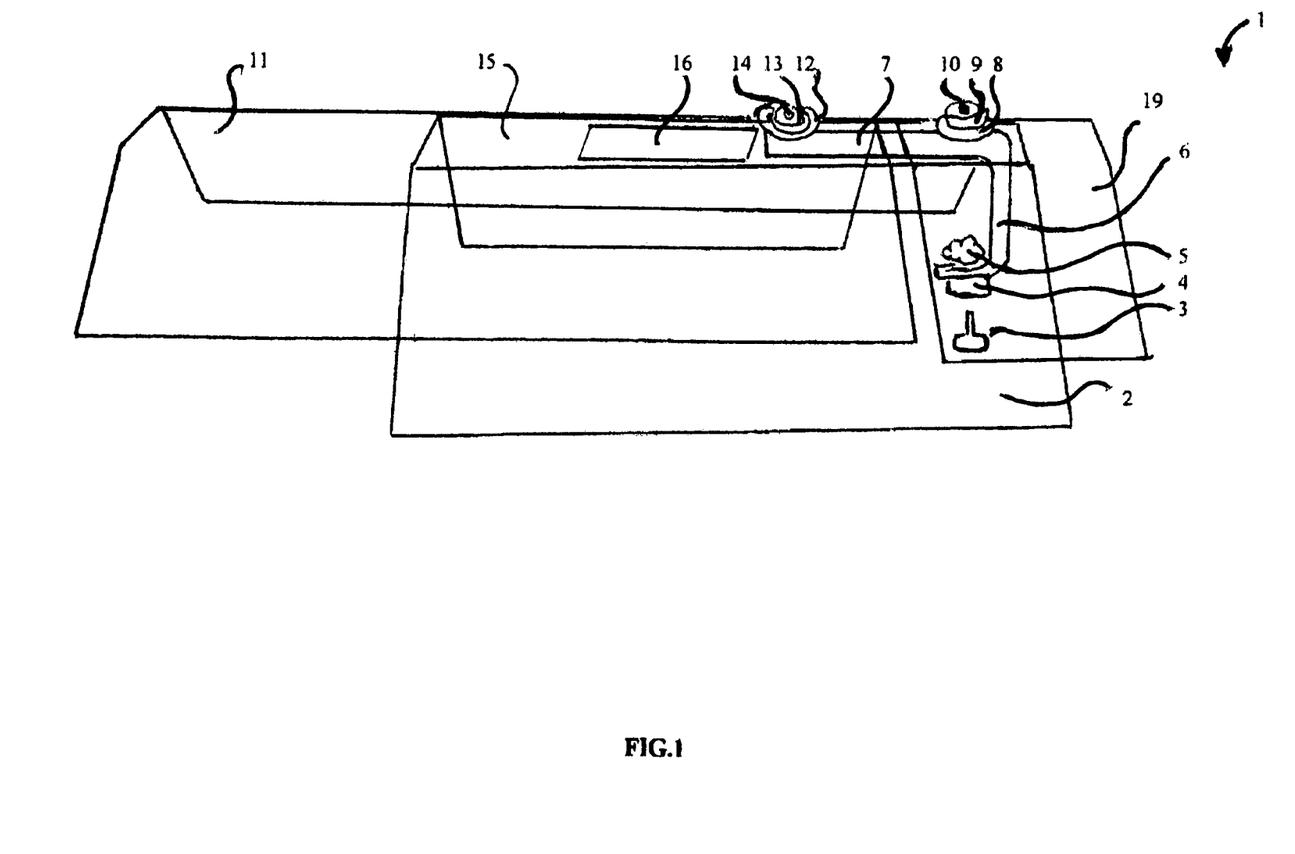
FIG. 1 is a view of the invention shown partially in full.

Referring to FIG. 1, a three part protective covering assembly 2, 11, 19 for protection of a camera against inclement weather, i.e. rain and/or snow. The assembly, which might, e.g. be made of a clear plastic material, such a clear covering material which provides full visibility of the equipment for the user, is mounted to a frame 6, which is made of lightweight aluminum for support, and a guide bracket 7, which when connected to the base shield 2, and the retractable shield 11, which slides along the base shield 2 and the guide bracket 7, and a rear shield which is attached to the rear of the base shield and secured by lock assembly 8, 9, 10, attaches to a camera. The adjustment of the lock assembly 8, 9, 10 and 12, 13, 14 allow the retractable shield to be adjusted to a preferred length. If desired, the retractable shield could similarly be made to separate from the base shield. Further, an extra rain cover shield 15, is permanently positioned for extra protection. Also, a Hot Shoe assembly, 3, 4, 5, is attached to the bracket which in turn is attached to the camera.

Figure 2:
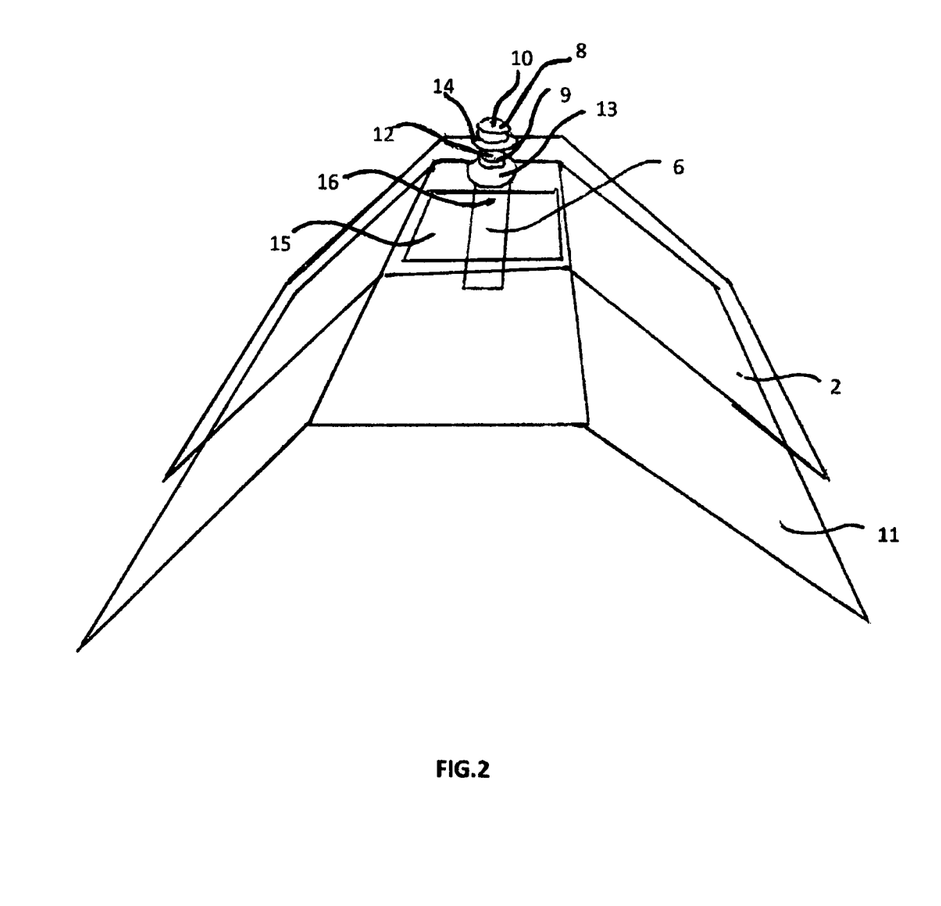
FIG. 2 is a perspective view from the front.
Figure 3:
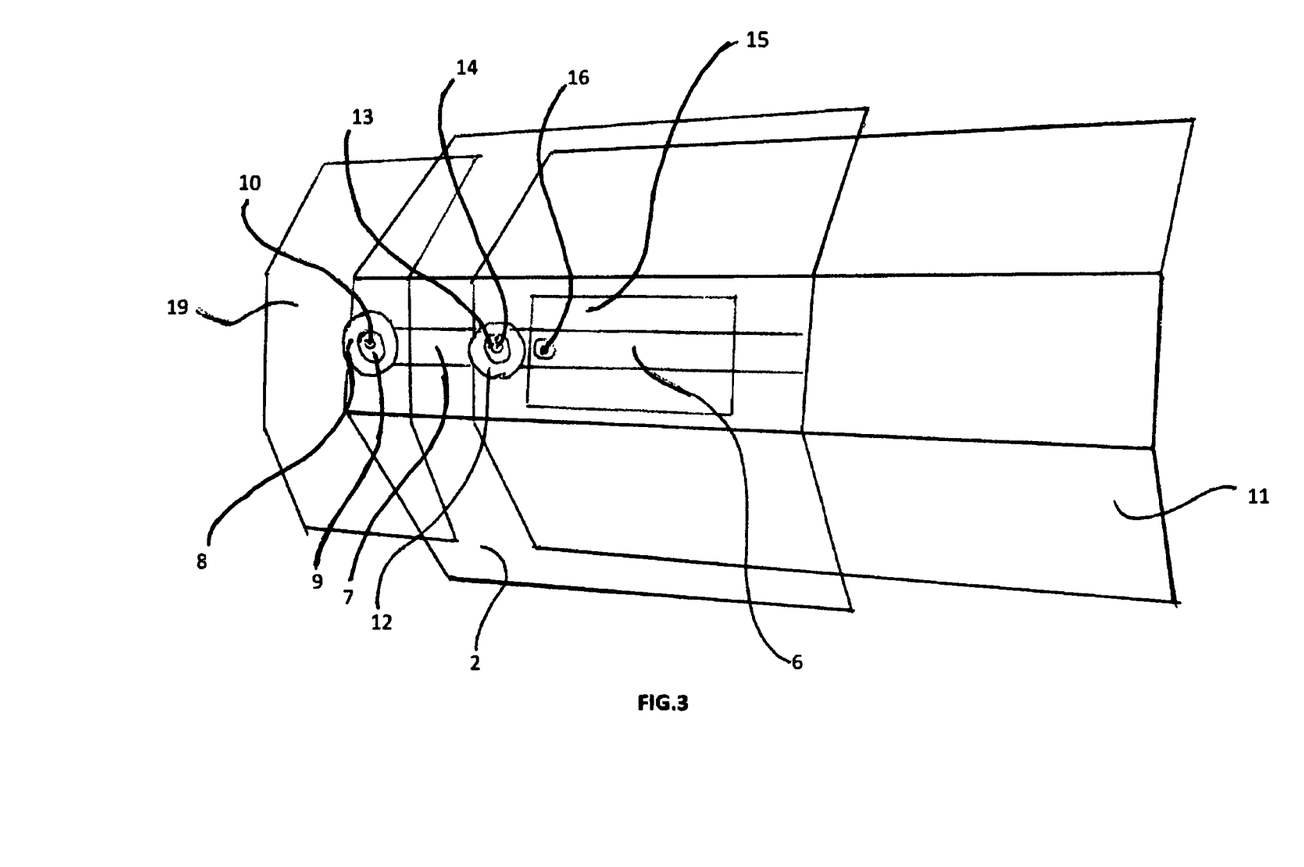
FIG. 3 is a perspective view from the top in the extended position.
Figure 4:
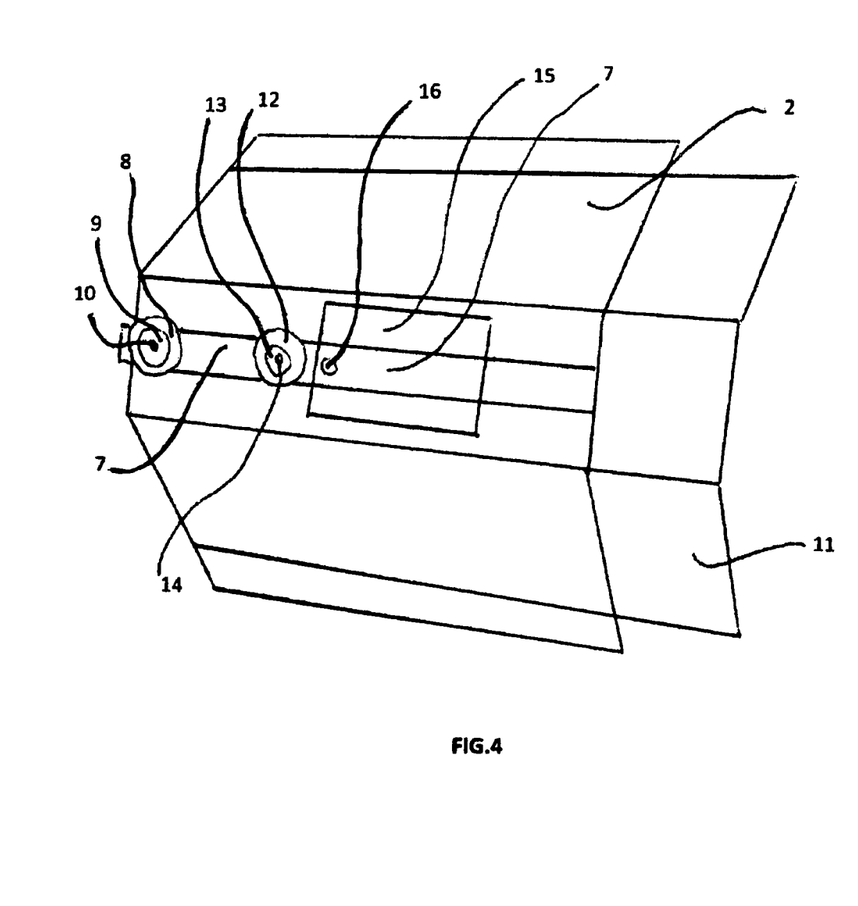
FIG. 4 is a perspective view from the top in the closed position.
Figure 5:
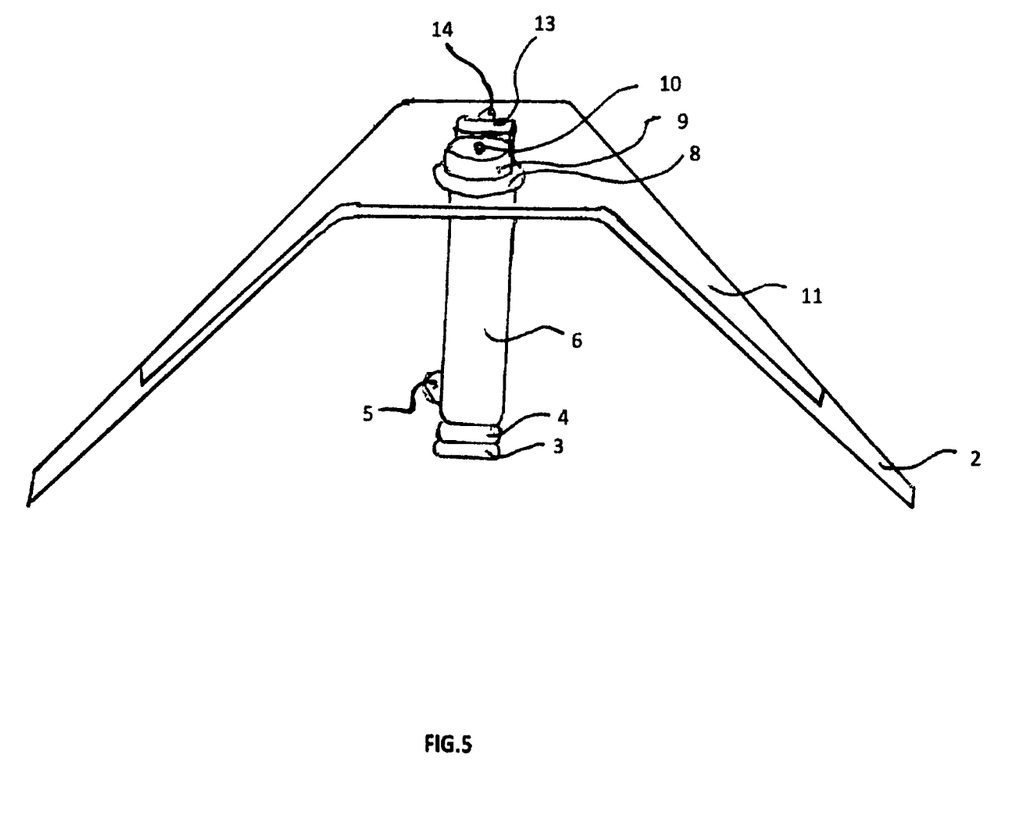
FIG. 5 is a perspective view from the rear.

In relation to FIG. 1, FIG. 2 is the frontal view, while FIG. 3 is a top view with 11 in the extended position, which slides along guide bracket 7, and is secured by a lock assembly 12, 13, 14 and 19 secured to base shield 2 while FIG. 4 show the retracted position, which is secured by a lock assembly 8, 9, 10, and lock assembly 12, 13, 14. and 19 removed Referring to FIG. 5, this is a rear view showing the shield 2, 11, the support bracket 6, which in the embodiment herein, is connected to the shield by means of a lock assembly 8, 9, 10, 13, 14 as well as the Hot Shoe bolt 3, secured by the Hot Shoe nuts 4 and 5.

Figure 6:
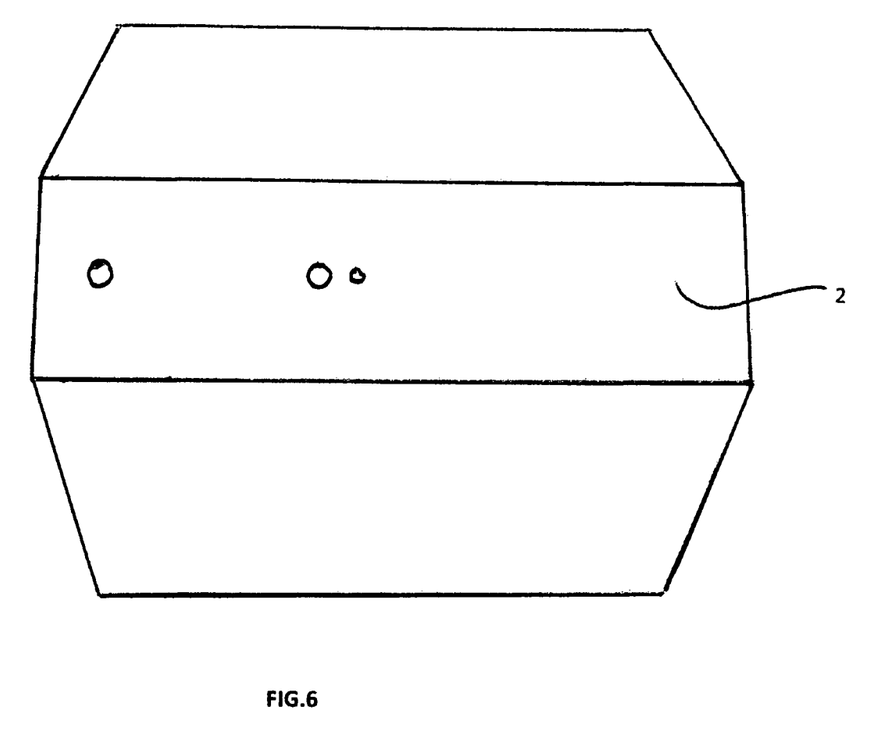
FIG. 6 is a top view of the base shield.
Figure 7:
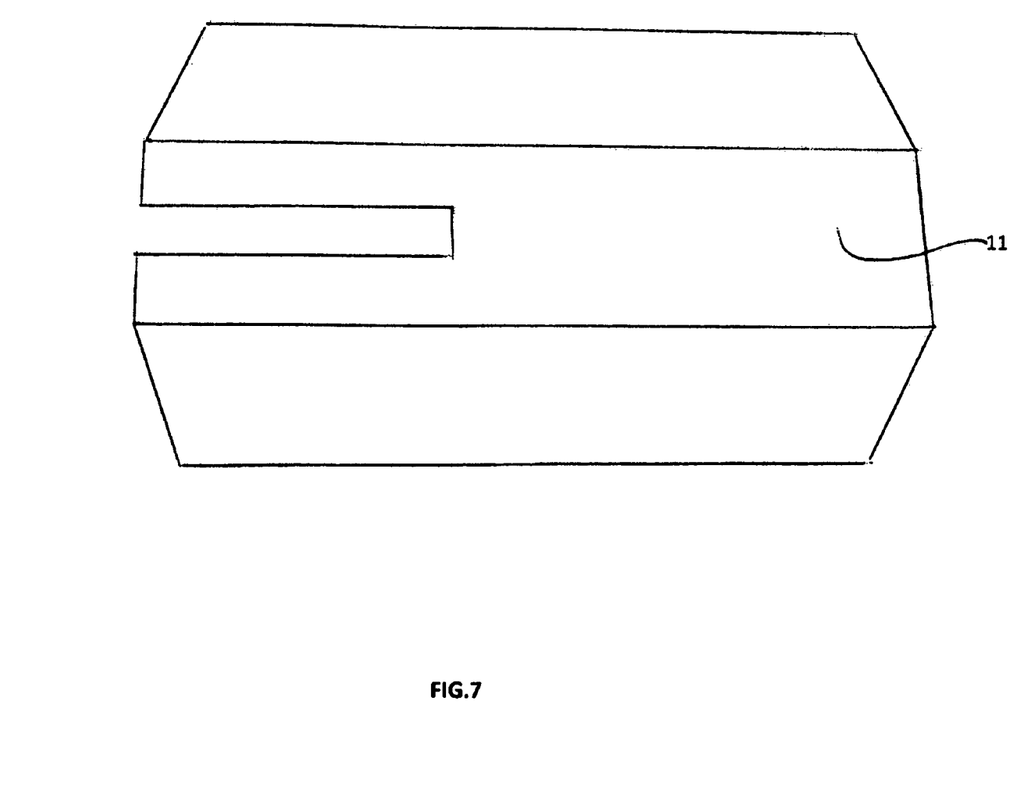
FIG. 7 is a top view of the retractable shield.

Referring to FIG. 6 is the schematic of the base shield 2 while FIG. 7 is the schematic of the retractable shield 11.

Figure 8:
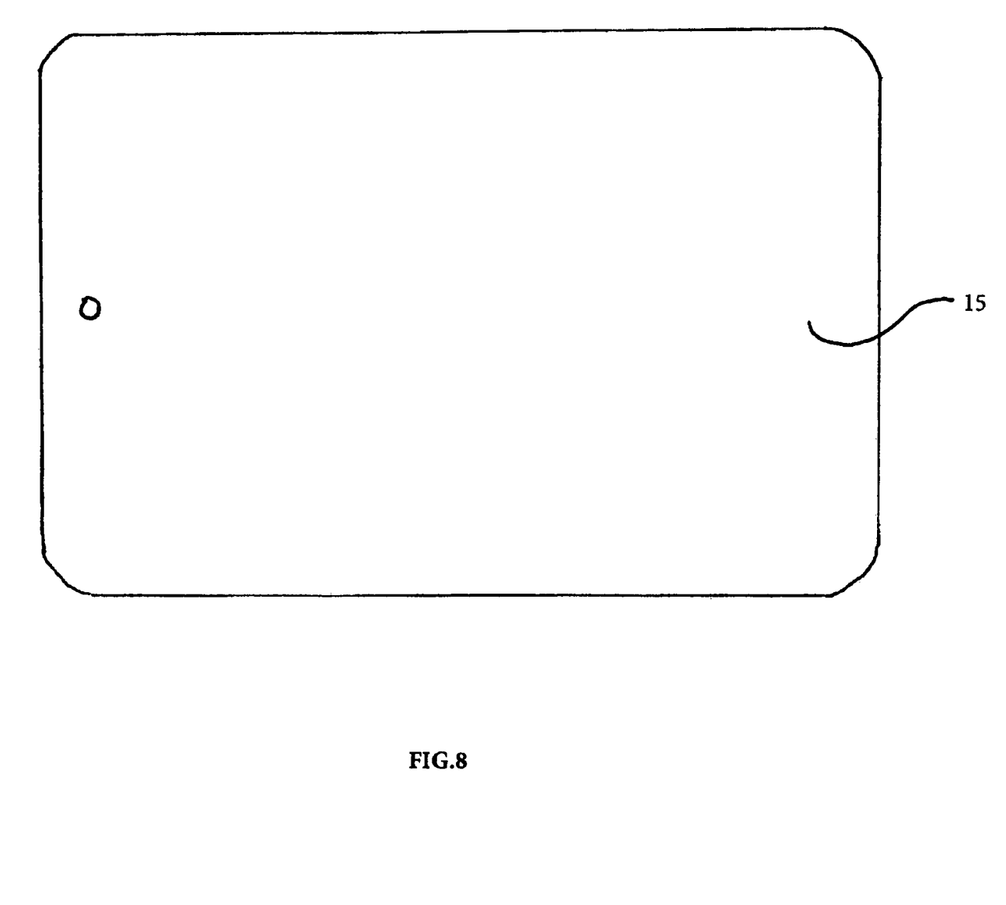
FIG. 8 is the slot cover rain shield.

Referring to FIG. 8 is the rain shield 15, which when permanently secured to the support bracket 6, guide 7 and base shield 2 affords extra protection.

Figure 9:
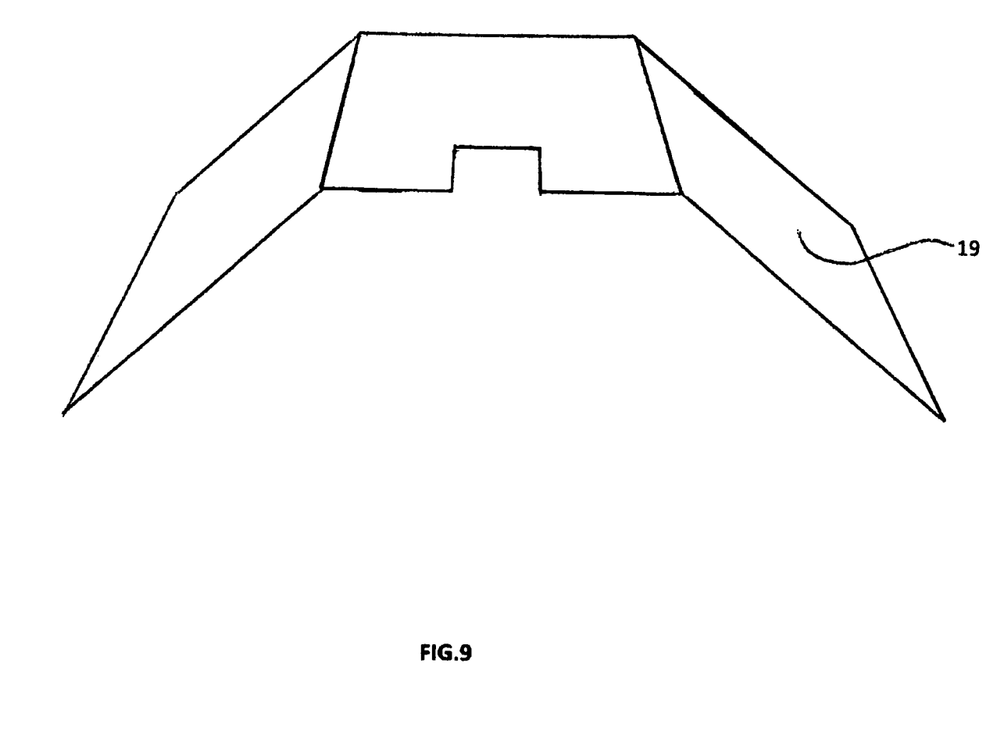
FIG. 9 is a view of the rear shield

Referring to FIG. 9 is the schematic of the rear shield

Figure 10:
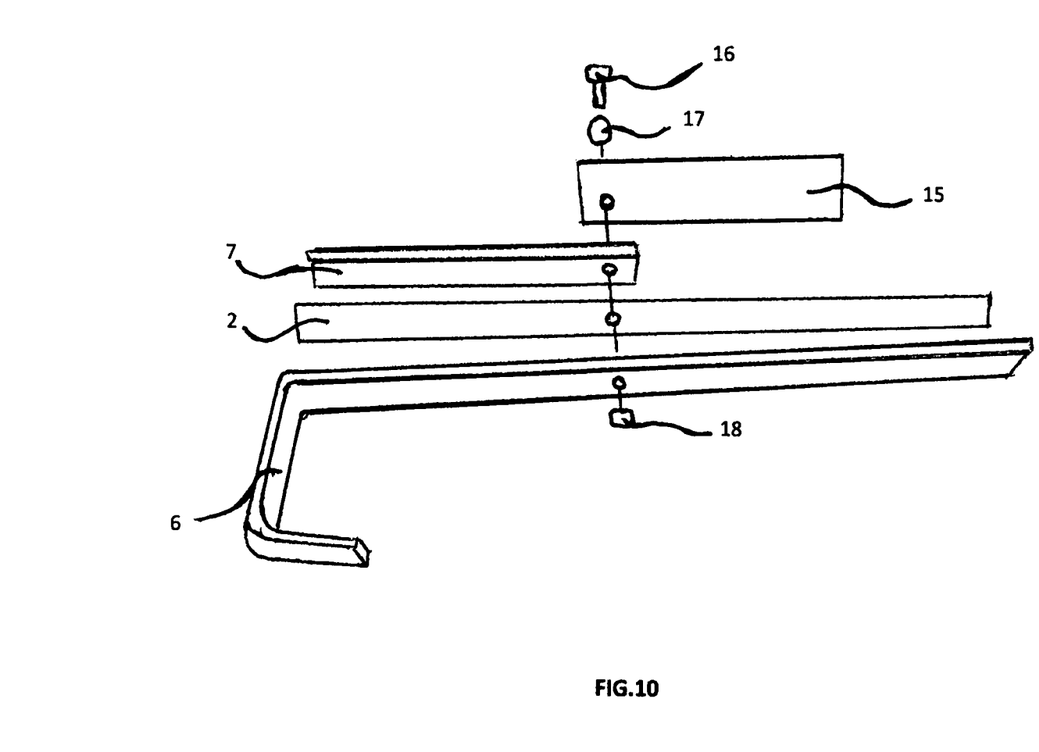
FIG. 10 is a view of the parts assembly of the slot cover rain shield.

Referring to FIG. 10, is the assembly of the permanent rain shield 15, a bolt 16 and washer 17, which are inserted through the opening of the shield 15, as well as the support bracket 6, guide bracket 7 and base shield 2, secured by a nut 18.

Figure 11:
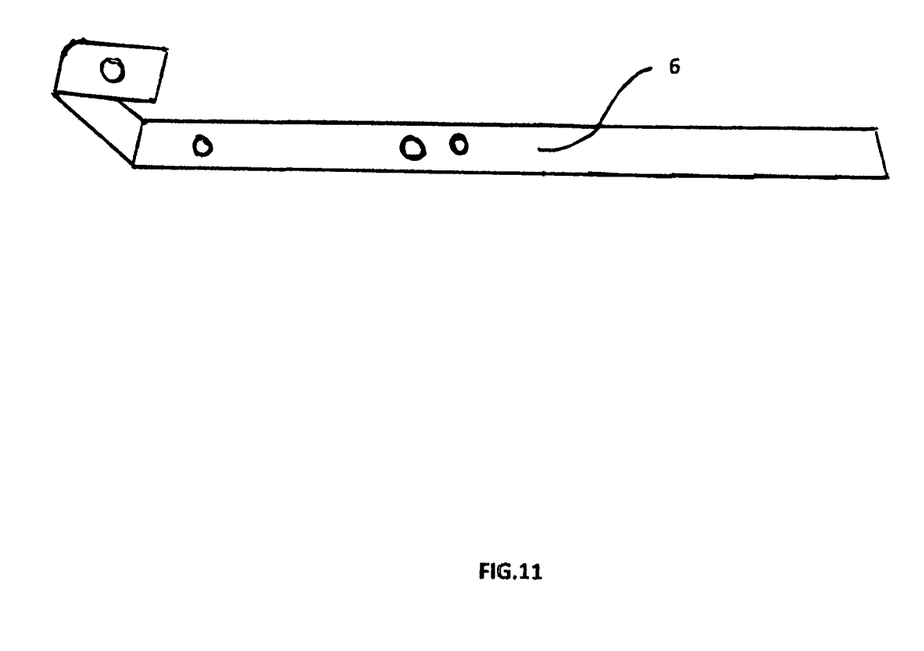
FIG. 11 is a view of the support bracket.
Figure 12:
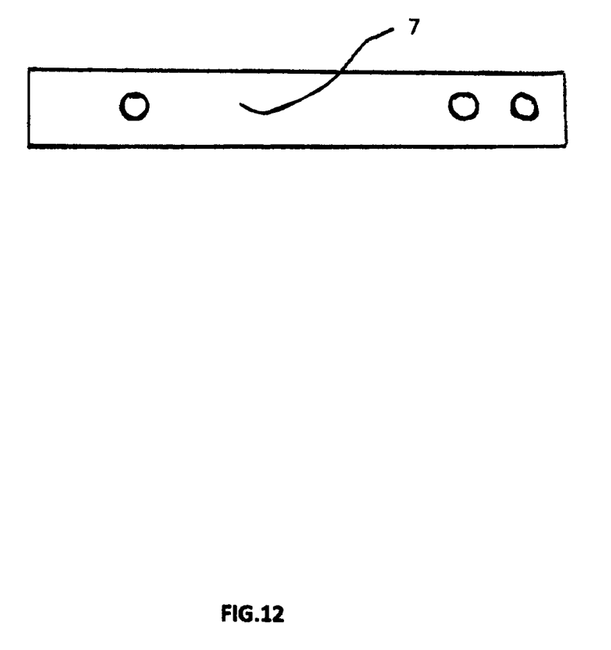
FIG. 12 is a view of the guide bracket.

Referring to FIG. 11 illustrates the rigid support bracket 6, while FIG. 12 illustrates the guide bracket 7.

Figure 13:
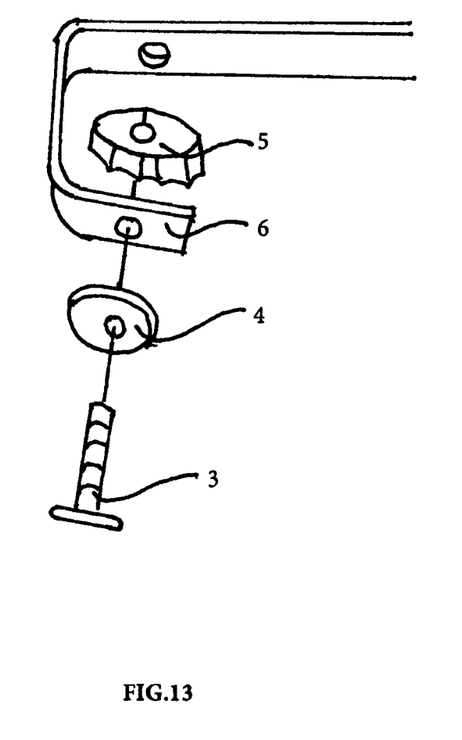
FIG. 13 is a view of the support bracket Hot Shoe assembly.
Figure 15:
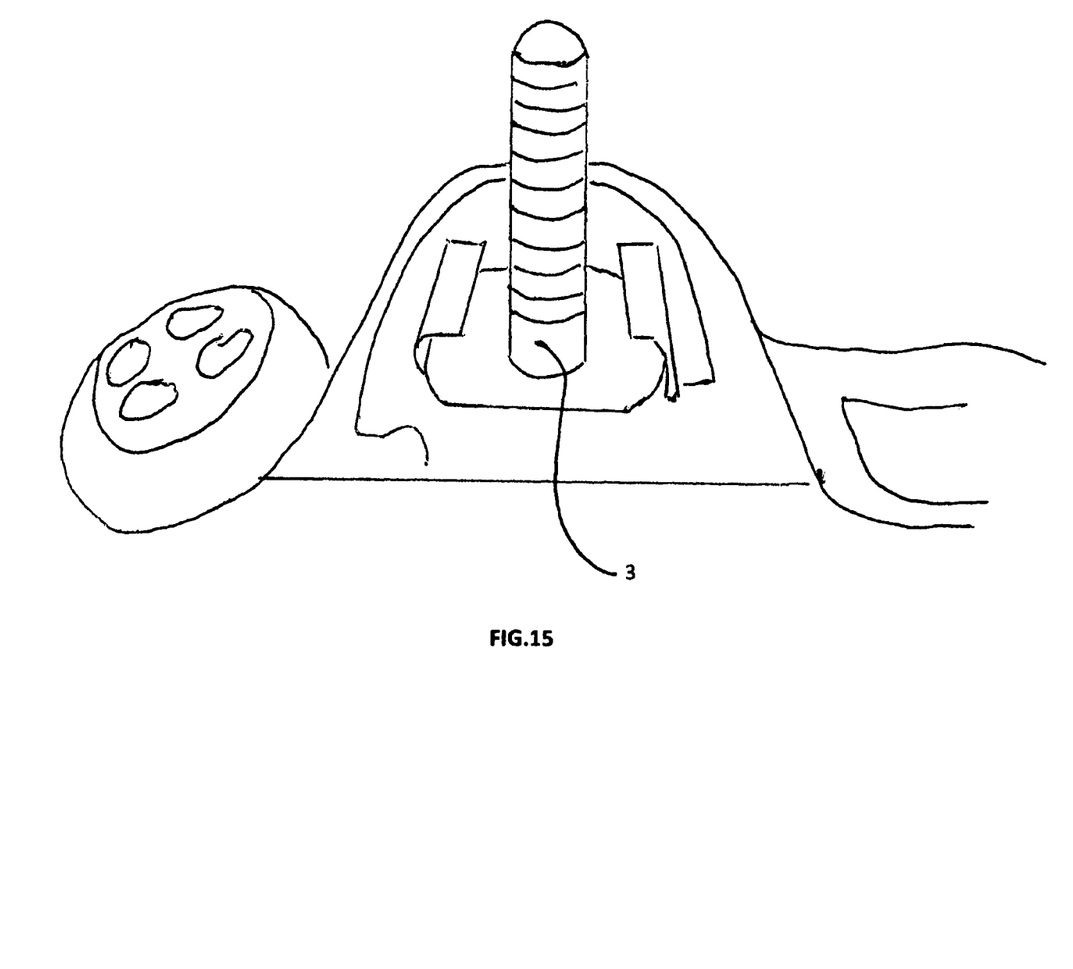
FIG. 15 is a view of the Hot Shoe screw placement.

Referring to FIG. 13, is the Hot Shoe assembly which secures the unit to the camera as illustrated in FIG. 15 to a universally generic hot shoe holder on the camera, consisting of a hot shoe bolt 3, with a lock nut 4, which secures the apparatus to the camera. The support bracket 6, is attached to the hot shoe bolt 3, and secured with a lock nut 5.

Figure 14:
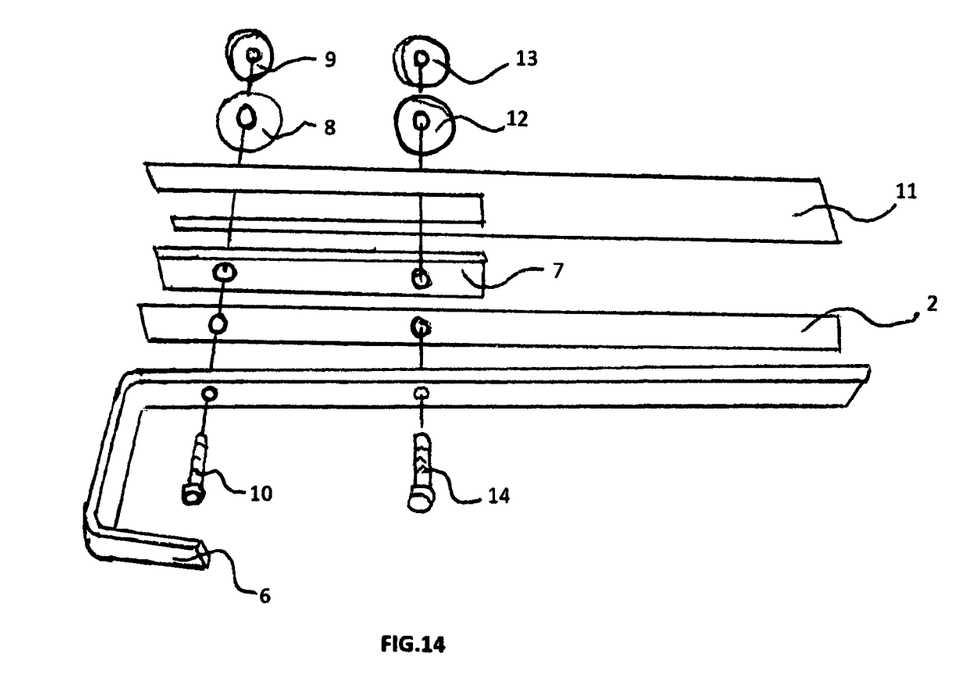
FIG. 14 is a view of the parts assembly for the support bracket.

Referring to FIG. 14, illustrating the securing of the shields 2, 11, to the support bracket 6, the support bolts 10 and 14 are inserted through the support bracket 6, through the base shield 11, through the guide bracket 7, through the open area in the retractable shield 11 and attached to lock nuts 9 and 13, and washers 8 and 12. Referring to FIG. 3, the retractable shield 11, straddles the guide bracket 7, which acts as a guide and stop for the retractable shield 11 and is secured with nuts 9 and 13 and washers 8 and 12. By adjusting the tension on lock nuts 9 and 13, the retractable shield 11, can easily be moved to the desired position.

Figure 16:
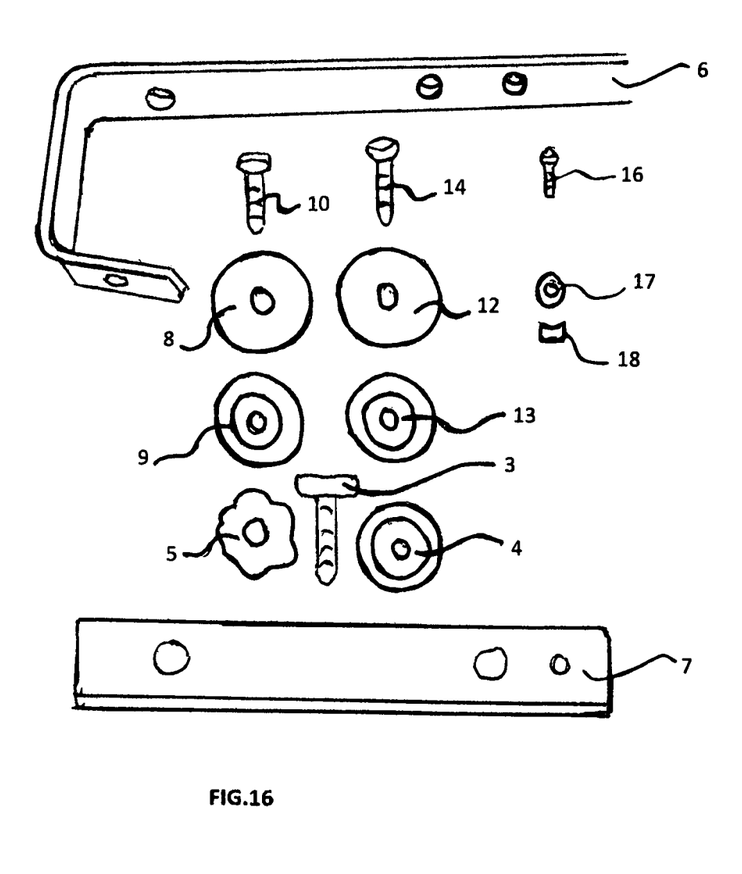
FIG. 16 is a view of the parts assembly.

Referring to FIG. 16, with respect to summary the parts which are used in securing the shields, there is a guide bracket 7, hot shoe bolt 3, a camera secure nut 4, the hot shoe assembly nut 5, the retractable position lock nut 13, the closed position lock nut 9, the retractable position washer 12, the closed position washer 8, the closed position bolt 10, the retractable position bolt 14, the rain shield bolt 16, the rain shield washer 17, and the rain shield nut 18.

Although the embodiment shown is particularly adapted for use with an SLR camera, it may be appreciated that by readily implemented modifications, other ways of employing a similar protective cover (eg. a non retractable shield) may be realized. It may be appreciated that the embodiment which has been described and has been given by way of illustration, may be made and that many modifications and changes may also be implemented without departing from the spirit of the invention.

I claim:

1. A protective covering for protecting a camera of a user comprising:
   an adjustable shield comprising at least two rigid shield components slideably adjustable relative to one another in a direction of shooting of said camera;
   a rigid frame bracket supporting said adjustable shield about the camera including a hot shoe connector for attaching to a corresponding hot shoe of said camera;
   a guide bracket which enables the at least two rigid shield components to slide relative to one another; and
   a lock assembly for securing the at least two rigid shield components, the rigid frame bracket, and the guide bracket to one another.

* * * * *